United States Patent [19]

Tsujikura

[11] 4,198,855

[45] Apr. 22, 1980

[54] LINE BREAK DETECTOR

[75] Inventor: Takashi Tsujikura, Yokohama, Japan

[73] Assignee: The Japan Steel Works Ltd., Tokyo, Japan

[21] Appl. No.: 883,359

[22] Filed: Mar. 6, 1978

[51] Int. Cl.² ............................................. G01M 3/26
[52] U.S. Cl. ................................................ 73/40.5 R
[58] Field of Search ...................... 73/40.5 R; 137/12; 340/605

[56] References Cited

U.S. PATENT DOCUMENTS

| | | | |
|---|---|---|---|
| 3,748,656 | 7/1973 | Gray et al. | 340/605 |
| 4,012,944 | 3/1977 | Covington | 73/40.5 |

Primary Examiner—Herbert Goldstein

[57] ABSTRACT

A break detector by which an internal pressure of a pipeline is detected and a changing rate thereof is detected and compared with a desired value and further, when the desired value is greater than the changing rate, a ramp output generates and is compared with the desired value and when the value becomes equal to same, a break signal is generated to cause fluid flow in the pipeline to stop, thereby serious pollution problems due to the occurrence of pipeline burst are prevented. The break detector according to the present invention can be used in poor environmental conditions and has high accuracy in operation thereof as well as simplicity and ease in adjustment, installation and maintanance regardless of the type of fluid flowing through the pipeline.

1 Claim, 1 Drawing Figure

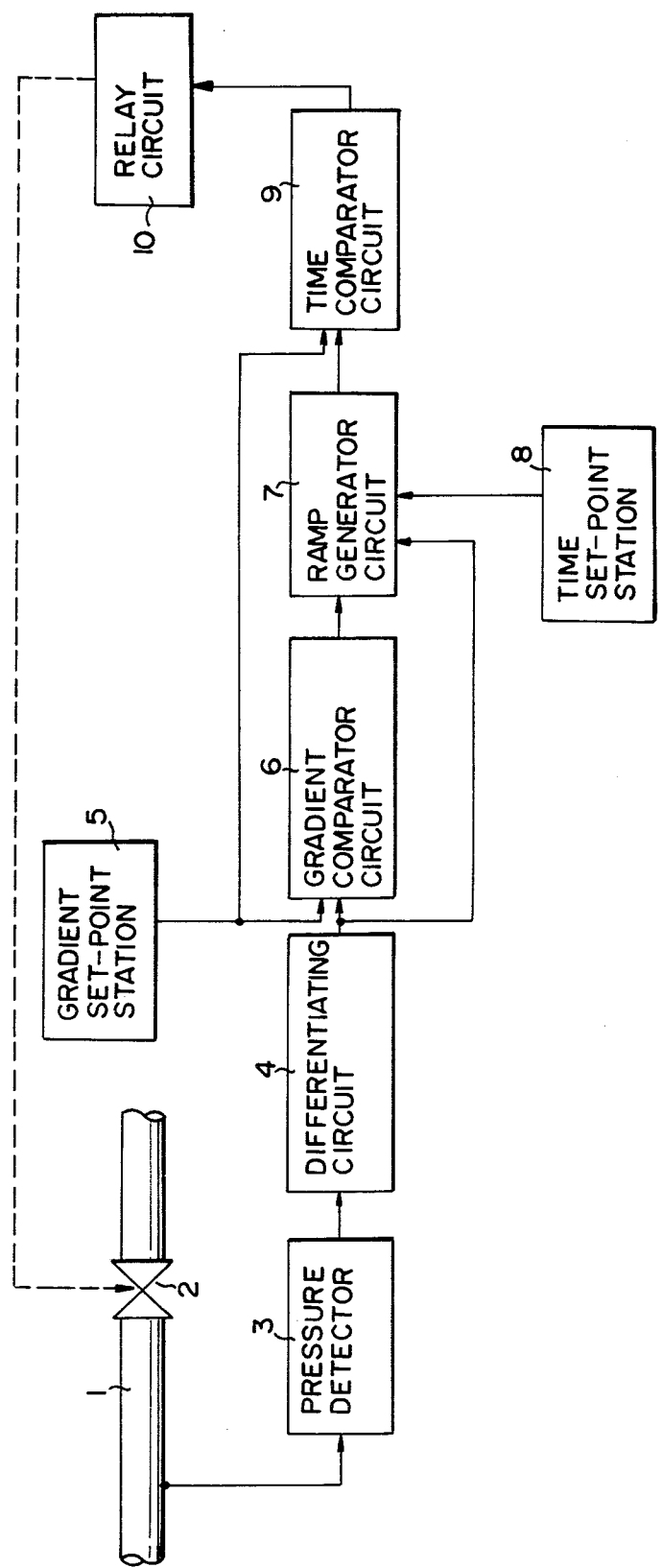

LINE BREAK DETECTOR

BACKGROUND OF THE INVENTION

The present invention relates to a line break detector and more particularly to an apparatus provided at desired portions of a pipeline for detecting an extraordinaly changing rate of an internal pressure of the pipeline through an electrical circuit when the pipeline bursts and for closing valves provided near the burst portions of the pipeline.

Occurrence of pipeline burst causes the fluid flowing through the pipeline to drain away and serious pollution problems arise in the neighborhood of the pipeline. If such pipeline burst is left as is, a great amount of energy resources, of course, is wasted. Therefore, it is necessary to minimize such serious pollution problems by providing detectors for detecting the occurrence of pipeline burst.

Previously, apparatuses consisting of mechanical elements, being utilized as the above-mentioned detector, have been developed and presented, but, however, such apparatuses include elements such as an orifice and a diaphragm or the like as indispensable elements and must be designed and produced in a manner that same are compatible with the type of fluid flowing through the pipeline since a change of characteristics of the apparatus occurs in response to the type of fluid. In addition, such conventional apparatuses are poor in thermal characteristics and therefore, in incapable of providing high accuracy in operation thereof, and require fine adjustments by skilled personnel.

Preferably, the line break detector should have adaptability for poor environmental conditions and high accuracy in operation as well as simplicity or ease in adjustment, installment and maintenance because the pipeline is often installed in very cold or hot districts.

SUMMARY OF THE INVENTION

An object of the present invention is to provide a break detector having adaptability for poor environmental condition and high accuracy in operation as well as simplicity and ease in adjustment, installment and maintenance.

According to the present invention, a line break detector is provided, which comprises: a pressure detector for detecting an internal pressure of a pipeline; a differentiating circuit for providing an output which is responsive to an amount of a changing rate of signals from the pressure detector; a gradient setpoint station for predetermining a desired value relating to the output of the differentiating circuit; a gradient comparator circuit for comparing the output of the differentiating circuit with the desired value of the gradient set-point station; a ramp generator circuit for receiving an output of the gradient comparator circuit and the output of the differentiating circuit, and for setting a degree of a gradient of an output of the ramp generator circuit; and a time comparator for generating a line break signal at the time an output of the ramp generator circuit becomes equal to the desired value of the gradient set-point station.

BRIEF DESCRIPTION OF THE DRAWING

A single FIGURE is a schematic diagram of the line break detector according to the preferred embodiment of the present invention.

DETAILED DESCRIPTION OF THE PREFERRED EMBODIMENT

Referring to the attached drawing, the line break detector according to a preferred embodiment of the present invention will be explained hereinafter.

In the drawing, reference numeral 1 designates a pipeline; 2 designates a pipeline valve provided at a desired portion of the pipeline 1; 3 designates a pressure detector for detecting an internal pressure of the pipeline 1 in the form of electrical signals; 4 designates a differentiating circuit for providing an output which is proportional to an amount of a changing rate of an input from the pressure detector 3 by differentiating same; 5 designates a gradient set-point station for predetermining a desired value relating to an amount of a changing rate of the electrical signals and for providing output signals being utilized for an input of a time comparator circuit 9; 6 designates a gradient comparator circuit for comparing the output of the differentiating circuit 4, which output corresponds to the amount of the changing rate of the electrical signals, with the desired value output from the gradient set-point station 5; 7 designates a ramp generator circuit for receiving the output of the gradient comparator circuit 6 and the output of the differentiating circuit 4, and for predetermining a degree of a gradient of the output of the ramp generator circuit 7 by using a time set-point station 8 which sets a detecting time; 9 designates a time comparator circuit for providing an output at the time the output of the ramp generator circuit 7 becomes equal to the desired value of the gradient set-point station 5; 10 designates a relay circuit actuated by the output of the time comparator circuit 9 to turn off the pipeline valve 2.

Next, an operation of the circuit explained in the single figure will be explained.

The internal pressure of the pipeline 1 is converted into the electrical signals by the pressure detector 3, and the electric signal is applied to the differentiating circuit 4. The output of the differentiating circuit 4 is proportional to the amount of the changing rate of the input signal and is compared with the output of the gradient set-point station 5 by the gradient comparator circuit 6 which actuates the ramp generator circuit 7 when the output of the differentiating circuit 4 is greater than that of the gradient set-point station 5. Thus, the ramp generator circuit 7 produces a ramp output having a gradient whose degree is proportional to the amount of the output of the differentiating circuit 4 and is inversely portional to the desired value of the time set-point station 8.

In case the ramp generator circuit 7 is not actuated by the gradient comparator circuit 6, same is in a reset condition and provides a constant output. The time comparator circuit 9 compares the output of the gradient set-point station 5 with that of the ramp generator 7, and actuates the relay circuit 10 if the amount of the output of the ramp generator 7 reaches or becomes equal to that of the gradient set-point station 5 to generate a line break signal, thereby the pipeline 1 is closed by the pipeline valve 2 actuated by the line break signal.

According to the present invention, when a change of the internal pressure of the pipeline occurs, such change which has a constant changing rate and continues during a constant period can be detected. Furthermore, the gradient set-point station 5 and the time set-point station 8 may be provided with a preferable scale such as $Kg/cm^2/min$ and min, respectively. However, such scale provided with the time set-point station 8 can indicate exactly an actual detecting time only when the amount of the changing rate of the internal pressure of the pipeline 1 is equal to the desired value predetermined by the gradient set-point station 5. In case the amount of the changing rate of the internal pressure of the pipeline 1 is greater than the predetermined value of the gradient set-point station 5, the actual detecting time is less than the indication of the scale of the time set-point station 8. This phenomenon occurs in the operation at the time the line break is detected and meets such a requirement that pipeline 1 should be turned off if the amount of the changing rate or usually lowering rate of the internal pressure of the pipeline 1 is large beyond the allowable one.

What is claimed is:

1. A line break detector comprising:
   a pressure detector for detecting an internal pressure of a pipeline;
   a differentiating circuit for providing an output which is related to an amount of a changing rate of signals from said pressure detector;
   a gradient set-point station for predetermining a desired value relating to said output of said differentiating circuit;
   a gradient comparator circuit for comparing said output of said differentiating circuit with said desired value of said gradient set-point station;
   a ramp generator circuit which is triggered by an output of said gradient comparator circuit and produces an output whose slope is related to said output of said differentiating circuit, and for setting a degree of a gradient of an output of said ramp generator circuit; and
   a time comparator for generating a line break signal at the time an output of said ramp generator circuit becomes equal to said desired value of said gradient set-point station within the period of time which is preset.